No. 788,566. Patented May 2, 1905.

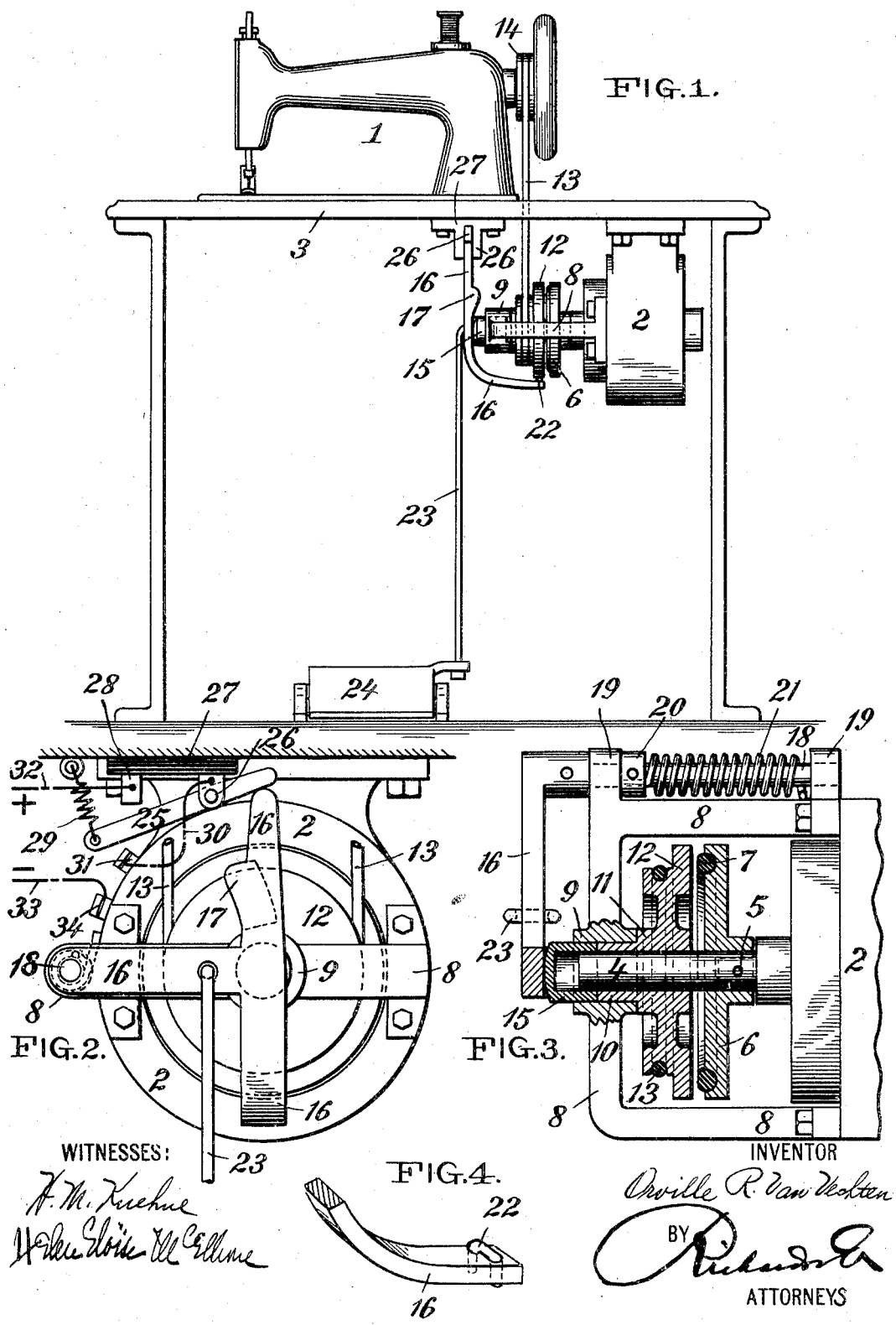

UNITED STATES PATENT OFFICE.

ORVILLE R. VAN VECHTEN, OF NEW YORK, N. Y., ASSIGNOR TO HERBERT B. COHO, OF MOUNT VERNON, NEW YORK, WHEELER & WILSON MANUFACTURING COMPANY, A CORPORATION OF CONNECTICUT, AND THE EMERSON ELECTRIC MFG. CO., OF ST. LOUIS, MISSOURI, A CORPORATION OF MISSOURI.

ELECTRIC MOTOR AND POWER-TRANSMITTER.

SPECIFICATION forming part of Letters Patent No. 788,566, dated May 2, 1905.

Application filed September 17, 1903. Serial No. 173,597.

*To all whom it may concern:*

Be it known that I, ORVILLE R. VAN VECHTEN, a citizen of the United States, residing in the borough of Manhattan, city of New York, State of New York, have invented a new and Improved Electric Motor and Power-Transmitter, of which the following is a specification.

This invention relates to a combined electric motor and power-transmitter adapted more particularly for operating sewing-machines, but applicable for driving other machinery or apparatus.

It is the object of the invention to provide a simple, compact, and inexpensive combination of electric motor and power-transmitter by which a sewing or other machine may be operated efficiently and economically.

The invention will first be described and then will be particularly defined in claims hereinafter set forth.

Reference is made to the accompanying drawings, forming part of this specification, in which—

Figure 1 is a front elevation of one arrangement of my improved electric motor and power-transmitter as adapted for operating a sewing-machine. Fig. 2 is an enlarged end view of the motor and power-transmitter and a switch cutting the motor into and out of circuit. Fig. 3 is a plan view of one end of the motor and the power-transmitter and treadle-operated-controlling lever drawn to the same scale as Fig. 2 and with parts in horizontal section in the plane of the motor-shaft, and Fig. 4 is a detailed perspective view of the brake end of the controlling-lever.

As a convenient arrangement for operating a sewing-machine 1, the motor-frame 2 is fastened to the under side of the machine-table 3, and to the motor-shaft 4 is fixed by a pin 5 or otherwise a driving-wheel 6, having a frictional face which may be a strip of leather or rubber belting 7, set into an annular recess of the wheel. To the motor-frame is fixed a yoke 8, having an outer bearing 9, in which is guided an extension 10 of the hub 11 of the power-transmitting and brake wheel 12, which is journaled for free rotation on the motor-shaft 4. A belt 13 passes from wheel 12 to the driving-wheel 14 of the sewing-machine. On the shaft 4 and within the bearing 9 next the driving-wheel-hub extension 10 is loosely fitted a suitable presser device, which may be a ring, but is preferably made as a cup 15, the rounded outer closed end or bottom of which is presented to a controlling-lever 16, which has a cam 17, adapted to press the cup 15, and consequently the wheel 12, inward on the motor-shaft 4 to force said wheel into contact with the driving-wheel 6 7 of the electric motor, and thus start the sewing-machine after the motor has first been cut into circuit by a switch device presently explained.

As shown in the drawings, the lever 16 is fixed to a shaft 18, journaled in lugs 19 on the motor-frame yoke 8, and a collar 20, pinned to said shaft, prevents lateral bodily movement of the shaft and lever. On the shaft 18 is placed a spiral spring 21, one end of which is fixed to the collar 20, while its other end bears against the yoke 8. This spring thus turns the shaft 18 and swings the controlling-lever 16 upward to normal position (shown in Figs. 1 and 2 of the drawings) and thereby also brings a friction-brake surface 22 on the free end of the lever against a brake-rim on the power-transmitter wheel 12 to stop the latter and at the same time open the switch to cut out the motor, as hereinafter more fully explained. The friction-brake surface 22 may be a strip of leather, the ends of which are forced into holes in the lever to secure it thereto, as shown in Fig. 4 of the drawings. The lever 16 is adapted for operation by a rod 23, coupled to the lever and also to a heel-and-toe treadle 24, arranged at the base of the sewing-machine.

Within the scope of this invention the switch device cutting the electric motor into and out of circuit may have any approved construction permitting its operation relatively to the controlling-lever 16, as herein described. I show the switch made with a lever 25, fulcrumed at a binding-post 26, held to an insulating-base 27, to which are also fixed suitable contact-plates 28, to or between which the lever 25 is normally drawn by a spring 29, as may be permitted by the lever 16, the upper end of which projects beneath the switch-lever and normally holds the switch open, as shown in Figs. 1 and 2 of the drawings, to cut out the motor. A wire 30 connects the motor binding-post 31 with the switch-lever fulcrum-post 26. One main-line wire, 32, is fixed to the switch-contacts 28, while the other main-line wire, 33, is coupled to a post 34 on the motor-frame, thus providing for supplying electric energy to the motor when the switch-lever 25 engages the contacts 28.

The operation is very simple and effective. The spring 21 normally exerts sufficient force to raise the controlling-lever 16 and the connected treadle 24 and to hold the switch-lever 25 open to cut out the motor and also to hold the brake 22 of lever 16 against the brake-rim of the transmitter-wheel 12, as shown in Figs. 1 and 2 of the drawings. To start the sewing-machine, the operator will simply depress the toe end of the treadle 24, and thus swing the lever 16 downward on its fulcrum 18. The first effect will be to release the switch-lever 25 and permit its spring 29 to engage it with the contacts 28, and thereby cut the motor into circuit to start it when free or without load and simultaneously relieve the power-transmitter wheel 12 of the stopping pressure of the lever-brake 22. The motor thus free from load will very quickly acquire most effective full speed before the cam 17 on the descending lever 16 engages the cup 15. As the cam forces this cup 15 inward along the motor-shaft 4 the cup will move the power-transmitter wheel 12 along said shaft and into contact with the friction-surface 7 of the motor driving-wheel 6, and thus start the sewing-machine easily and quickly, with ample needle-working and cloth-feeding power to do effective sewing in fabric of any weight or thickness, the speed of the sewing-machine being controllable by the degree of pressure on the treadle and the consequent force of lateral thrust of the lever-cam 17 on the cup 15 and the transmitter-wheel 12. To stop the sewing-machine, the operator will tilt the treadle 24 in opposite direction or remove his feet from the treadle. This lifts or permits lifting of the controlling-lever 16 to carry its cam 17 above and clear of the transmitter-cup 15 to free the wheel 12 from pressure against the motor driving-wheel 6 7, and later causes the lever 16 to strike the closed switch-lever 25 and quickly open the switch, as shown in Figs. 1 and 2 of the drawings, thereby cutting out the motor, and simultaneously brings the controlling-lever brake 22 against the now-released transmitter-wheel 12 to stop it and the sewing-machine as quickly as may be desired and without injurious shock to it or to any part of the electric motor and power-transmitter mechanism. When the treadle is not operated or when the feet are removed from it, the spring 21 holds the controlling-lever 16 and the switch-lever 25 in relative adjustments, preventing operation of the sewing-machine.

It is obvious that various changes in details of construction may be made by those skilled in this class of apparatus without departing from the spirit of the invention expressed in the appended claims.

I claim as my invention—

1. The combination, with the driven wheel of a sewing or other machine, of an electric motor having a driving-wheel fixed to its shaft, means supplying electric energy to the motor including a switch device, a power-transmitter including a wheel loose on the motor-shaft, means for rotating said driven wheel from said power-transmitter wheel, and means engaging said power-transmitter wheel with the motor driving-wheel and adapted also for operating the motor-circuit switch device.

2. The combination, with the driven wheel of a sewing or other machine, of an electric motor having a driving-wheel fixed to its shaft, means supplying electric energy to the motor including a self-closing switch device, a power-transmitter including a wheel loose on the motor-shaft, means for rotating said driven wheel from said power-transmitter wheel, and means engaging said power-transmitter wheel with the motor driving-wheel and adapted also for opening the switch to cut out the motor and adapted also to permit closing of said switch to start the motor without load prior to engagement of the power-transmitter wheel with the motor driving-wheel for operating the sewing or other machine.

3. The combination, with the driven wheel of a sewing or other machine, of an electric motor having a driving-wheel fixed to its shaft, means supplying electric energy to the motor including a switch device, a power-transmitter including a wheel loose on the motor-shaft, means for rotating said driven wheel from said power-transmitter wheel, and means engaging said power-transmitter wheel with the motor driving-wheel and adapted also for opening the switch to stop the motor after inoperative relative adjustment of the motor driving-wheel and the power-transmitter wheel has been effected.

4. The combination, with the driven wheel of a sewing or other machine, of an electric motor having a driving-wheel fixed to its shaft, means supplying electric energy to the motor including a self-closing switch device, a power-transmitter including a wheel loose on the motor-shaft, means for rotating said driven wheel from said power-transmitter wheel, and means engaging said power-transmitter wheel with the motor driving-wheel and permitting closing of the switch to start the motor without load prior to operative relative adjustment of the power-transmitter wheel and the motor driving-wheel and also opening the switch to stop the motor after inoperative relative adjustment of the power-transmitter wheel and motor driving-wheel has been effected.

5. The combination, with the driven wheel of a sewing or other machine, of an electric motor having a driving-wheel fixed to its shaft, means supplying electric energy to the motor including a switch device, a power-transmitter comprising a power and brake wheel loose on the motor-shaft, means for rotating the driven wheel from said power and brake wheel, and means engaging the latter wheel with the motor driving-wheel and adapted also for operating the motor-switch device, said wheel-engaging and switch-operating means also having a brake-surface which is released from the power and brake wheel when the latter is engaged with the motor driving-wheel while the switch is closed and is engaged with said power and brake wheel when the latter is disengaged from the motor driving-wheel while the switch is open.

6. The combination, with the driven wheel of a sewing or other machine, of an electric motor having a driving-wheel fixed to its shaft, means supplying electric energy to the motor including a switch device, a power-transmitter comprising a power and brake wheel loose on the motor-shaft, means for rotating the driven wheel from said power and brake wheel, and means engaging the latter wheel with the motor driving-wheel and adapted also for operating the motor-switch device, said wheel-engaging and switch-operating means also having a brake-surface which is released from the power and brake-wheel when the latter is engaged with the motor driving-wheel while the switch is closed and is engaged with said power and brake wheel when the latter is disengaged from the motor driving-wheel while the switch is open; said mechanism being arranged to permit closing of the switch to start the motor without load prior to engagement of the power and brake wheel with the motor driving-wheel for operating the sewing or other machine.

7. The combination, with the driven wheel of a sewing or other machine, of an electric motor having a driving-wheel fixed to its shaft, means supplying electric energy to the motor including a switch device, a power-transmitter comprising a power and brake wheel loose on the motor-shaft, means for rotating the driven wheel from said power and brake wheel, and means engaging the latter wheel with the motor driving-wheel and adapted also for opening the switch to stop the motor after inoperative relative adjustment of the power and brake wheel and the motor driving-wheel has been effected, said wheel-engaging and switch-operating means also having a brake-surface which is engaged with the power and brake wheel when the latter is disengaged from the motor driving-wheel while the switch is open.

8. The combination, with the driven wheel of a sewing or other machine, of an electric motor having a driving-wheel fixed to its shaft, means supplying electric energy to the motor including a self-closing switch device, a power-transmitter comprising a power and brake wheel loose on the motor-shaft, means for rotating the driven wheel from said power and brake wheel, and means engaging the latter wheel with the motor driving-wheel and permitting closing of the switch to start the motor without load prior to operative relative adjustment of the power and brake wheel and motor driving-wheel, said wheel-engaging means also being adapted to open the switch to stop the motor after inoperative relative adjustment of the power and brake wheel and motor driving-wheel has been effected; said wheel-engaging and switch-operating means also having a brake-surface which is engaged with the power and brake wheel when the latter is disengaged from the motor driving-wheel.

9. In an electric motor and power-transmitter, the combination with the motor-shaft and a friction driving-wheel fixed thereon, of a power-transmitting friction-wheel loosely mounted on the motor-shaft, means supplying electric energy to the motor including a self-closing switch, and a spring-actuated lever adapted to normally open the switch to cut out and stop the motor and also adapted to bring the loose power-transmitter wheel into engagement with the friction driving-wheel of the motor after the switch is closed to cut in and start the motor.

10. In an electric motor and power-transmitter, the combination with the motor-shaft and a friction driving-wheel fixed thereon, of a power-transmitting friction and brake wheel loosely mounted on the motor-shaft, means supplying electric energy to the motor including a self-closing switch, and a spring-actuated lever adapted to normally open the switch to cut out and stop the motor and also adapted to bring the loose power-transmitting friction and brake wheel into engagement with the friction driving-wheel of the motor after the switch is closed to cut in and start the motor; said lever also having a brake-surface which is normally held to the friction and brake wheel after the switch is opened.

11. In an electric motor and power-transmitter, the combination with the motor-shaft and a driving-wheel fixed thereon, of a power-transmitter including a wheel loose on the motor-shaft, means supplying electric energy to the motor including a self-closing switch, a spring-actuated lever adapted to normally open the switch to cut out and stop the motor and also adapted to bring the loose power-transmitter wheel into engagement with the motor driving-wheel after the switch is closed to cut in and start the motor, and a treadle coupled to said spring-actuated lever for operating it.

12. In an electric motor and power-transmitter, the combination with the motor-shaft and a driving-wheel fixed thereon, of a power-transmitter including a power and brake wheel loose on the motor-shaft, means supplying electric energy to the motor including a self-closing switch, a spring-actuated lever adapted to normally open the switch to cut out and stop the motor and also adapted to bring the loose power and brake wheel into engagement with the motor driving-wheel after the switch is closed to cut in and start the motor; said lever also having a brake-surface which is normally held to the power and brake wheel after the switch is opened, and a treadle coupled to said spring-actuated lever for operating it.

13. The combination with a sewing or other machine, of an electric motor having a shaft 4, a driving-wheel fixed to said shaft, a bearing 9 alined with shaft 4, a power-transmitter including a wheel loosely fitted on the shaft 4, a presser device such as a cup 15 on the shaft 4 within the bearing 9, a spring-actuated lever 16 having a cam 17 adapted for action on the presser device or cup 15 to engage the loose power-transmitter wheel with the motor driving-wheel, and means supplying electric energy to the motor including a switch device operative by the lever 16 and cutting the motor into and out of circuit.

14. The combination with a sewing or other machine, of an electric motor having a shaft 4, a driving-wheel fixed to said shaft, a bearing 9 alined with shaft 4, a power-transmitter including a wheel fitted loosely on the shaft 4, a presser device such as a cup 15 on the shaft 4 within the bearing 9, a spring-actuated lever 16, having a cam 17 adapted for action on the presser device or cup 15 to engage the loose power-transmitter wheel with the motor driving-wheel, means supplying electric energy to the motor including a switch device operative by the lever 16 and cutting the motor into and out of circuit, and a treadle coupled to lever 16 for operating it.

15. The combination with a sewing or other machine, of an electric motor having a shaft 4, a driving-wheel fixed to said shaft, a bearing 9 alined with shaft 4, a power-transmitter including a power and brake wheel fitted loosely on the shaft 4 and adapted to operate the sewing or other machine, a presser device such as a cup 15 on the shaft 4 within the bearing 9, a spring-actuated lever 16, having a cam 17 adapted for moving the presser device or cup 15 to engage the loose power-transmitter wheel with the motor driving-wheel, said lever also having a brake-surface adapted to act on the power and brake wheel, and means supplying electric energy to the motor including a switch device operative by the lever 16 and cutting the motor into and out of circuit.

In witness whereof I have hereunto set my hand in presence of two witnesses.

ORVILLE R. VAN VECHTEN.

Witnesses:
WILLIAM J. COEN,
CHARLES SIMMONS.